United States Patent [19]
Farrington et al.

[11] Patent Number: 5,991,168
[45] Date of Patent: Nov. 23, 1999

[54] TRANSIENT RESPONSE NETWORK, METHOD OF DIVERTING ENERGY IN A MULTIPLE OUTPUT POWER CONVERTER AND A POWER CONVERTER EMPLOYING THE SAME

[75] Inventors: Richard W. Farrington, Rockwall; Mark Elliott Jacobs, Dallas, both of Tex.

[73] Assignee: Lucent Technologies Inc., Murray Hill, N.J.

[21] Appl. No.: 09/072,709

[22] Filed: May 5, 1998

[51] Int. Cl.⁶ .............................. H02M 3/335; H02J 1/00; G05F 1/577

[52] U.S. Cl. .............................. 363/16; 363/65; 323/267; 307/39

[58] Field of Search .................................. 363/65, 67, 68, 363/69, 16; 307/31, 32, 33, 34, 35, 38, 39, 19, 20; 323/267

[56] References Cited

U.S. PATENT DOCUMENTS 5,270,578  12/1993  Yamamura ............................. 307/34 X
5,387,820  2/1995  Imagawa .................................. 307/31

OTHER PUBLICATIONS

"Current Diverter—A Novel Circuit to Regulate Multiple Outputs" by Jack Palczynski; pp. 456–461, 1992: IEEE (No Month).

Primary Examiner—Y. J. Han

[57] ABSTRACT

For use with a power converter having a main output and an auxiliary output and an auxiliary regulating switch that regulates a voltage at the auxiliary output, a transient response network, and method of diverting energy from the main output to the auxiliary output. In one embodiment, the transient response network, includes: (1) an energy diverting switch interposed between the main output and the auxiliary output, and (2) a control circuit, coupled to the energy diverting switch, that senses a characteristic of the power converter and causes the energy diverting switch to conduct a current in response to a substantial load reduction at the main output thereby diverting energy from the main output to the auxiliary output.

21 Claims, 3 Drawing Sheets

TRANSIENT RESPONSE NETWORK, METHOD OF DIVERTING ENERGY IN A MULTIPLE OUTPUT POWER CONVERTER AND A POWER CONVERTER EMPLOYING THE SAME

TECHNICAL FIELD OF THE INVENTION

This invention relates to power conversion and, more particularly, to a multiple output power converter and method of operation thereof.

BACKGROUND OF THE INVENTION

Multiple output switching converters are often employed to provide multiple output voltage levels from a single transformer with the outputs consisting of a main output and at least one auxiliary output. Typically, the main output is designed to operate at a higher voltage (e.g., a higher DC voltage) than the auxiliary output. When changes in load conditions occur, multiple output converters endure output voltage variations that are detrimental to the overall operation of the converter. In switching converters, a controlling parameter, such as the duty cycle of the main power switch therein, may be regulated to either increase or decrease the voltages at the main and auxiliary outputs, concurrently. When only one output is regulated, however, all other outputs may be adversely affected with load variations. The problem is exacerbated when the load requirements at the outputs move in opposite directions, since each output demands a conflicting change in duty cycle of the main power switch to adjust the output voltage to the desired value.

Common techniques for improving output regulation of a multiple output converter include weighted sum averaging, series pass regulation and shunt regulation. Weighted sum averaging allows improvement of the output regulation of one output at the expense of the other. A series pass regulator may be used to regulate small amounts of current. As current requirements increase, the series pass regulator becomes more expensive and the power losses increase. Shunt regulators divert current through series impedances in order to vary the output voltage. The current is shunted to the ground or common side and power is dissipated. Each of these techniques offers trade-offs between the efficiency and regulation of the converter.

Another technique used in multiple output converters is called a current diverter circuit as disclosed by J. Palczynski, in "Current Diverter-A Novel Circuit to Regulate Multiple Outputs," pp. 456–462, Proceedings of APEC 1993, which is incorporated herein by reference. The current diverter circuit is basically a shunt regulator for application to multiple output converters that do not have independent regulation of the separate outputs. The current diverter circuit continuously bleeds current from the higher voltage output to the lower voltage output. This technique, although an improvement from an efficiency perspective over straight shunt or series regulators, results in a continuous power loss with a resulting degradation of the power unit efficiency. The current diverter circuit is also limited by the accuracy of regulation achievable at the outputs of the converter. Additionally, there is a practical limit to the maximum power that can be bled from one output to the other.

Multiple output converters which employ independent precision regulators for each output are able to achieve accurate regulation is of both outputs. Typically, the main output voltage is controlled by regulating the energy applied to the transformer using PWM control of the main power switch on the primary side of the transformer. The other or auxiliary output, on the other hand, is regulated by an independent means on the secondary side of the transformer. The independent means may be a magnetic amplifier or an equivalent active circuit.

A particularly troubling problem exists in this multiple output converter when a significant portion of the load on the main output decreases. When the load is removed or greatly reduced, the regulating circuit for the main output drops to a minimum modulation condition. Since the auxiliary output also receives its input from energy transferred across the transformer, the independent regulating means for the auxiliary output typically cannot compensate for the substantial decline of the regulating signal for the main output. Consequently, the auxiliary output drops out of regulation for a period of time causing an unacceptable decrease in the auxiliary output voltage. If the auxiliary output is supplying power to a computer circuit, for instance, the loss of regulation, even for a brief period of time, can have catastrophic consequences which cannot be corrected even when the load at the main output returns to an acceptable level and regulation of the auxiliary output is restored.

Accordingly, what is needed in the art is a system that maintains regulation of the output voltages for a multiple output converter even in the event of transient conditions, such as a decrease in the load at the main output, while preserving the overall efficiency of the converter.

SUMMARY OF THE INVENTION

To address the above-discussed deficiencies of the prior art, the present invention provides for use with a power converter having a main output and an auxiliary output and an auxiliary regulating switch that regulates a voltage at the auxiliary output, a transient response network, a method of diverting energy from the main output to the auxiliary output and a power converter employing the same.

In one embodiment, the transient response network, includes: (1) an energy diverting switch interposed between the main output and the auxiliary output, and (2) a control circuit, coupled to the energy diverting switch, that senses a characteristic of the power converter and causes the energy diverting switch to conduct a current in response to a substantial load reduction at the main output thereby diverting energy from the main output to the auxiliary output.

The present invention therefore introduces the broad concept of diverting energy from the main to the auxiliary output in response to a substantial load reduction at the main output. For reasons that will become more apparent, with a substantial load reduction, the auxiliary regulator switch cannot adequately regulate the auxiliary output. In accordance therewith, the transient response network senses a characteristic within the power converter indicative of the load reduction at the main output and employs a control circuit to cause an energy diverting switch to divert energy to the auxiliary output thereby enhancing a regulation thereof. It should further be understood that the principles of the present invention are equally applicable to power converters having two or more outputs.

In one embodiment of the present invention, the characteristic includes the voltage at the auxiliary output. The load reduction at the main output may be determined by measuring voltage, current, power or another suitable characteristic of the power converter. For instance, sensing the voltage at the main output is a direct indicator of the load reduction. Of course, the broad scope of the present invention is not limited to a specific characteristic.

In one embodiment of the present invention, the network includes a drive network that enhances a gain of the energy diverting switch. In an embodiment to be illustrated and described, the drive network includes a switching device to enhance the gain of the energy diverting switch. Any gain enhancing network, however, is within the broad scope of the present invention.

In one embodiment of the present invention, the substantial load reduction is about a 50% reduction. The reduction in load to facilitate the diversion of energy to the auxiliary output is application and converter topology specific. In some applications, a 30% reduction in load triggers the control circuit to operate the energy diverting switch to the auxiliary output. Any percentage reduction in load to ensure proper operation of the power converter employing the transient response network is well within the broad scope of the present invention.

In one embodiment of the present invention, the energy diverting switch is selected from the group consisting of a bipolar transistor and a field-effect transistor (FET). Any switching device is well within the broad scope of the present invention.

In one embodiment of the present invention, the power converter further includes a main power switch that regulates a voltage at the main output. The main power switch typically impresses an input voltage from a source of electrical power across the power converter and controls the main output thereof. A pulse-width modulation (PWM) controller as part of a feedback circuit, for instance, further facilitates regulation of the main output. The broad scope of the present invention, however, is not limited to a particular power train topology or control technique.

In one embodiment of the present invention, the power converter is selected from the group consisting of a buck converter, a bridge converter, a forward converter and a flyback converter. The aforementioned topologies are submitted for illustrative purposes only. Any power converter topology presently available or hereinafter discovered is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
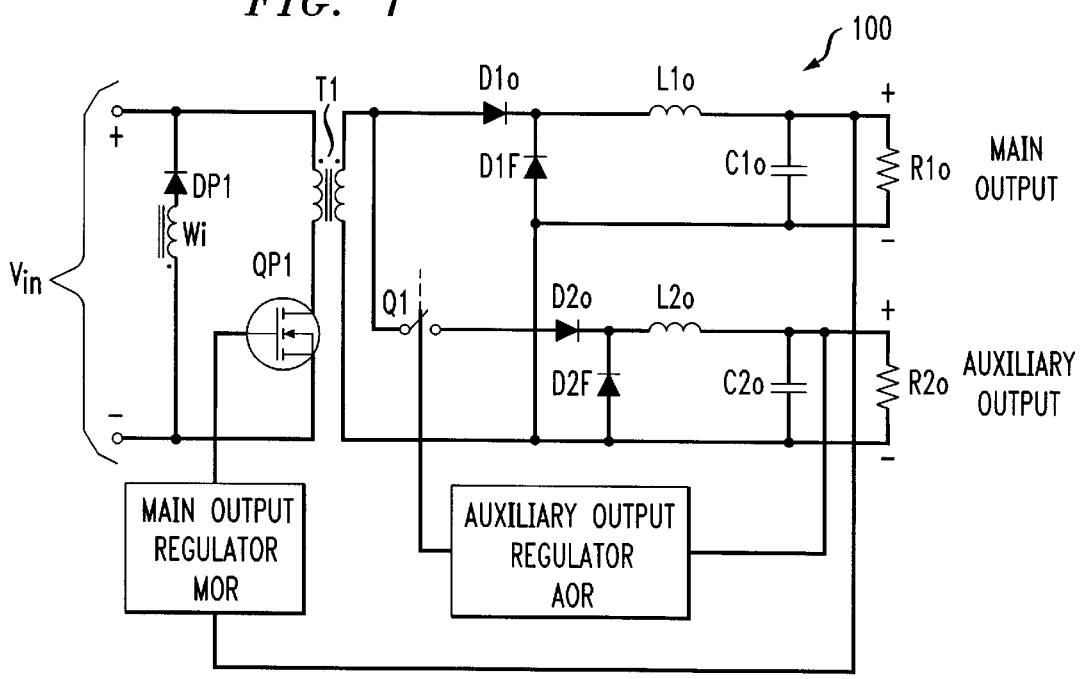
FIG. 1 illustrates a schematic diagram of a power converter providing an environment for application of the principles of the invention.

Referring initially to FIG. 1, illustrated is a schematic diagram of a power converter 100 providing an environment for application of the principles of the invention. The power converter 100 includes a shared input power section having a transformer T1, a main power switch QP1, a transformer reset diode DP1 and a transformer reset winding Wi (part of T1). The converter 100 also includes a main output section having first and second main output diodes D1o, D1F, an output filtering inductor L1o, a output filtering capacitor Clo and a main output load represented by a resistor R1o. The converter 100 further includes an auxiliary output section having an auxiliary regulator switch Q1, first and second auxiliary output diodes D2o, D2F, an output filtering inductor L2o, an output filtering capacitor C2o and an auxiliary output load represented by a resistor R2o.

The input power section provides power to both the main and auxiliary branches simultaneously. A main output regulator MOR (including, for instance, an error amplifier and a pulse width modulation (PWM) generator analogous to the control circuit and PWM generator illustrated in FIG. 3) supplies a PWM drive signal to the main power switch QP1 which in turn drives the input side of the transformer T1. The modulation of the main power switch QP1 is controlled to provide proper voltage regulation of the main output. In this type of multiple output switching converter, the main output voltage is typically greater than the auxiliary output voltage. In accordance therewith, the auxiliary regulating switch Q1 has a duty cycle less than the duty cycle of the main power switch QP1 in order for the auxiliary output voltage to be less than the main output voltage.

Pulse width modulation control, for instance, of the duty cycle of the auxiliary regulator switch Q1 is provided by an auxiliary output regulator AOR (analogous to the main output regulator MOR) which maintains the auxiliary output voltage regulation under steady state conditions. Thus, under normal, steady state operating conditions, both the main and auxiliary output voltages may be accurately regulated. As discussed earlier, a substantial transient reduction of the main output load causes the main power switch QP1, driven by the main output regulator, to operate under a reduced duty cycle to keep the main output voltage regulated at the reduced load current. This action causes a temporary but significant loss of energy to be applied to the transformer T1. The auxiliary regulator switch Q1, driven by the auxiliary output control circuit, generally cannot compensate for this reduction in energy at the transformer T1 and the auxiliary output voltage drops below its regulated value.

Figure 2:
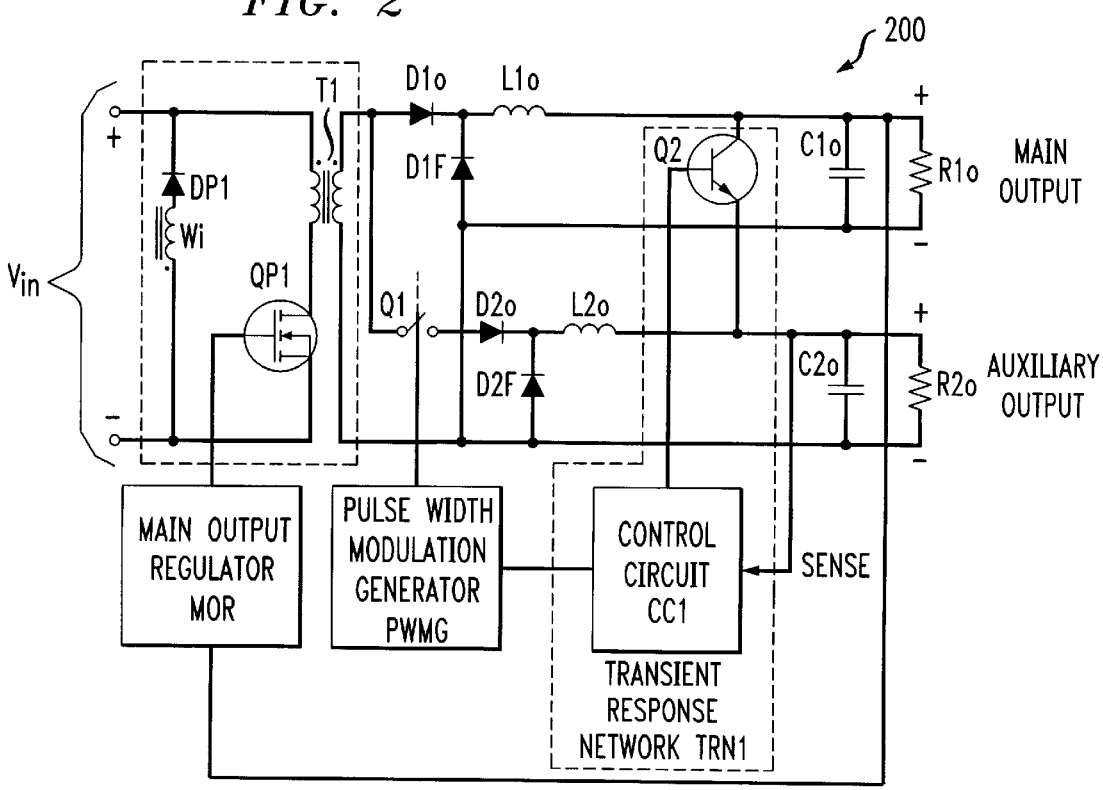
FIG. 2 illustrates a schematic diagram of an embodiment of a power converter constructed according to the principles of the present invention.

Turning now to FIG. 2, illustrated is a schematic diagram of an embodiment of a power converter 200 constructed according to the principles of the present invention. The power converter 200 includes a shared input power section having a transformer T1, a main power switch QP1, a transformer reset diode DP1 and a transformer reset winding Wi (part of T1). The power converter 200 also includes a main output section having first and second main output diodes D1o, D1F, an output filtering inductor L1o, an output filtering capacitor Clo and a main output load represented by a resistor R1o. The power converter 200 further includes an auxiliary output section having an auxiliary regulator switch Q1, first and second auxiliary output diodes D2o, D2F, an output filtering inductor L2o, an output filtering capacitor C2o and an auxiliary output load represented by a resistor R2o.

The power converter 200 still further includes a transient response network TRN1 having an energy diverting switch Q2 interposed between the main output and the auxiliary output. The transient response network TRN1 also includes a control circuit CC1, coupled to the energy diverting switch Q2, that senses a characteristic of the power converter 200 and causes the energy diverting switch Q2 to close in response to a substantial load reduction at the main output thereby diverting energy from the main output to the auxiliary output. While the power converter 200 is a forward converter topology, other converter topologies are well within the broad scope of the present invention.

In this embodiment, the control of the duty cycle of the main power switch QP1 ultimately regulates a voltage at the main output. The main power switch QP1 typically impresses an input voltage from a source of electrical power Vin across the transformer T1 and controls the main output thereof. A main output regulator MOR (including, for instance, an error amplifier and a PWM generator analogous to the control circuit and PWM generator illustrated in FIG. 3) as part of a feedback circuit, further facilitates regulation of the main output. The broad scope of the present invention, however, is not limited to a particular control technique.

The present invention therefore introduces the broad concept of diverting energy from the main to the auxiliary output in response to a transient condition such as a substantial load reduction at the main output. The transient response network TRN1 senses a characteristic (e.g., a voltage at the auxiliary output) within the power converter 200 indicative of the load at the main output and employs the control circuit CC1 to cause the energy diverting switch Q2 to divert energy to the auxiliary output thereby enhancing its regulation. The energy diverting switch Q2 only diverts energy to the auxiliary output for a period of time when a non-steady state (i.e., transient) condition occurs and operates under the direction of the control circuit CC1. The steady state condition of the energy diverting switch Q2 is normally open and therefore does not allow energy transfer from the main output to the auxiliary output in this operating mode. The energy diverting switch Q2 may be any controllable switch. Furthermore, the control circuit CC1 in association with the leading edge PWMG modulates the duty cycle of the auxiliary regulator switch Q1 to regulate the auxiliary output.

The redirecting of energy from the main output to the auxiliary output has the benefit of increasing the load on the main output just after the time when a significant portion of the main output load has been reduced. This action causes the main output regulating circuit to increase the duty cycle of the main power switch QP1 thus restoring a portion of the main output load that was lost when the main output load was significantly reduced.

The recovery of the main output regulating system also assists the capability of the auxiliary output regulating system to maintain auxiliary output regulation. The duty cycle recovery of the main power switch QP1 coupled with the transient redirecting of energy from the main output through the energy diverting switch Q2 allows both the main output and the auxiliary output to maintain their regulation under the transient condition that occurs when a significant portion of the main output load is reduced. Since the energy diverting switch Q2 is only conducting during the time of the transient condition, overall steady state converter efficiencies are maintained.

Figure 3:
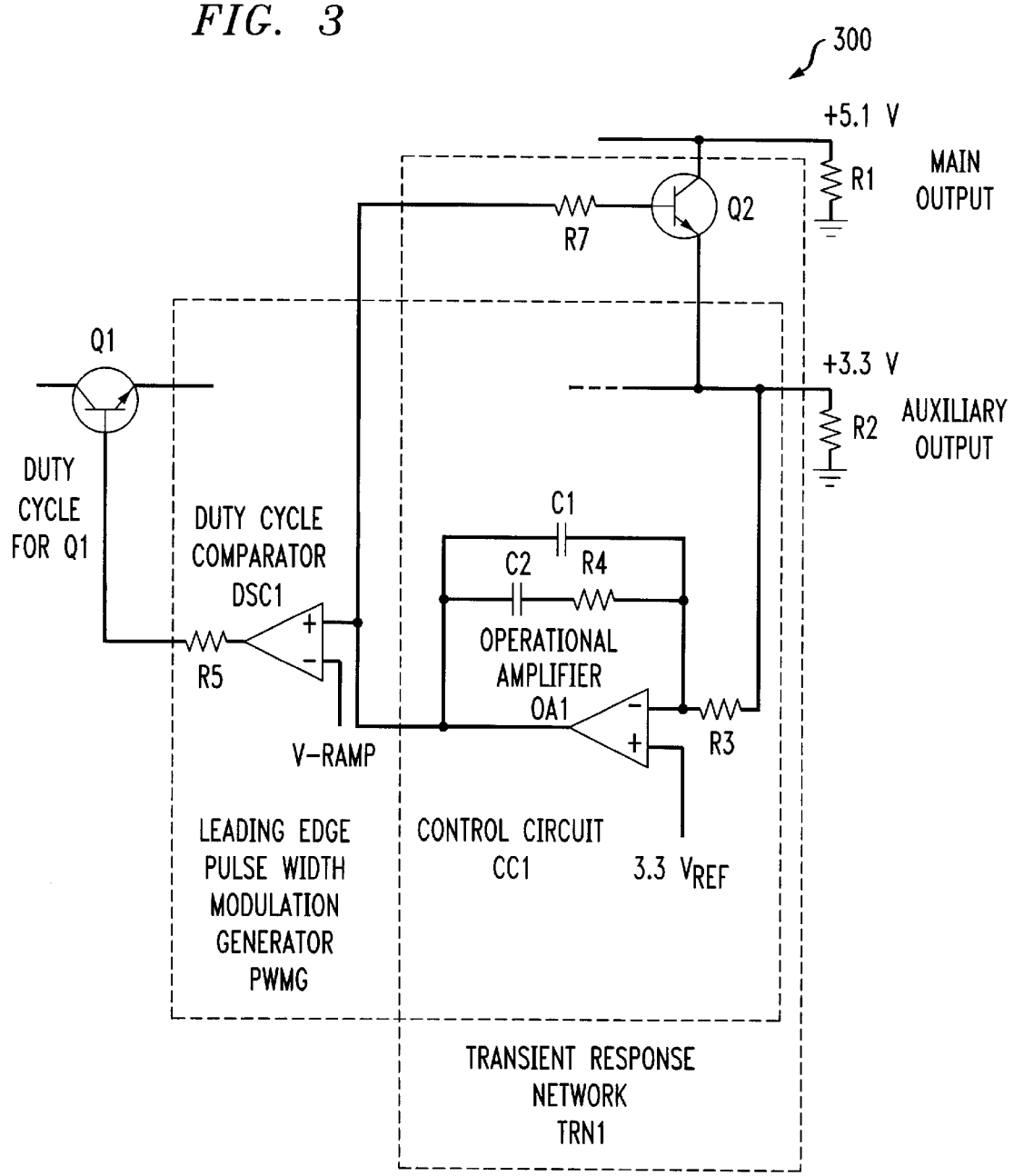
FIG. 3 illustrates a schematic diagram of an embodiment of a transient response network constructed according to the principles of the present invention.

Turning now to FIG. 3, illustrated is a schematic diagram of an embodiment of a transient response network 300 constructed according to the principles of the present invention. The transient response network 300 includes an energy diverting switch Q2 coupled to a drive network (e.g., a resistor R7) and a control circuit CC1. The control circuit CC1 includes an operational amplifier OA1, first and second resistors R3, R4 and first and second capacitors C1, C2. The control circuit CC1 is coupled to a leading edge PWM generator (PWMG) having a duty cycle comparator DSC1 and a resistor R5.

In this embodiment, the main output voltage is regulated to be about 5.1 volts and the auxiliary output voltage is regulated to be about 3.3 volts. The operational amplifier OA1 senses the auxiliary output voltage and compares it to a 3.3 volt reference voltage as shown. If the auxiliary output voltage drops below 3.3 volts, the output voltage of the operational amplifier OA1 rises causing corrective action. More specifically, the increased output voltage from the operational amplifier OA1 in conjunction with the ramping voltage of V-ramp causes the duty cycle comparator DSC1 to provide an increased duty cycle "ON" signal to the auxiliary regulator switch Q1 thereby providing energy to the auxiliary output to increase its output voltage. Under steady state conditions this will correct and restore the auxiliary output voltage to its proper value of 3.3 volts.

If a sudden and substantial reduction in the main output load occurs (e.g., a 70% reduction in load), the available duty cycle from the main power transformer will decrease substantially. Even maximizing the duty cycle to the auxiliary regulator switch Q1 will lack the ability to restore the auxiliary output voltage to its regulated output value of 3.3 volts because of the absence of main power duty cycle which results from the severity of the transient condition. The auxiliary output voltage will continue to decrease causing the output of the operational amplifier OA1 to continue to rise thereby turning the energy diverting switch Q2 "ON". This allows current to flow from the main output to the auxiliary output which will restore the auxiliary output to its regulated voltage value, and , coincidentally, help reduce the transient increase in voltage on the main output.

During this time, the main output voltage is maintained at its regulated voltage value by the main output regulating system and the main power switch QP1. When the transient condition subsides and the auxiliary output voltage recovers to its regulated value through the actions described above, the output of the operational amplifier OA1 returns to its steady state value. This condition returns the energy diverting switch to its "OFF" condition allowing normal, steady state regulation to occur through the auxiliary regulator switch Q1 and overall power converter efficiencies to be maintained. The first and second capacitors C1, C2 and the first and second resistors R3, R4 determine the poles and zeros of the feedback circuit by methods well known in the art. The resistor R5 provides a means of adjusting the base current for the auxiliary regulator switch Q1 when it is conducting.

Figure 4:
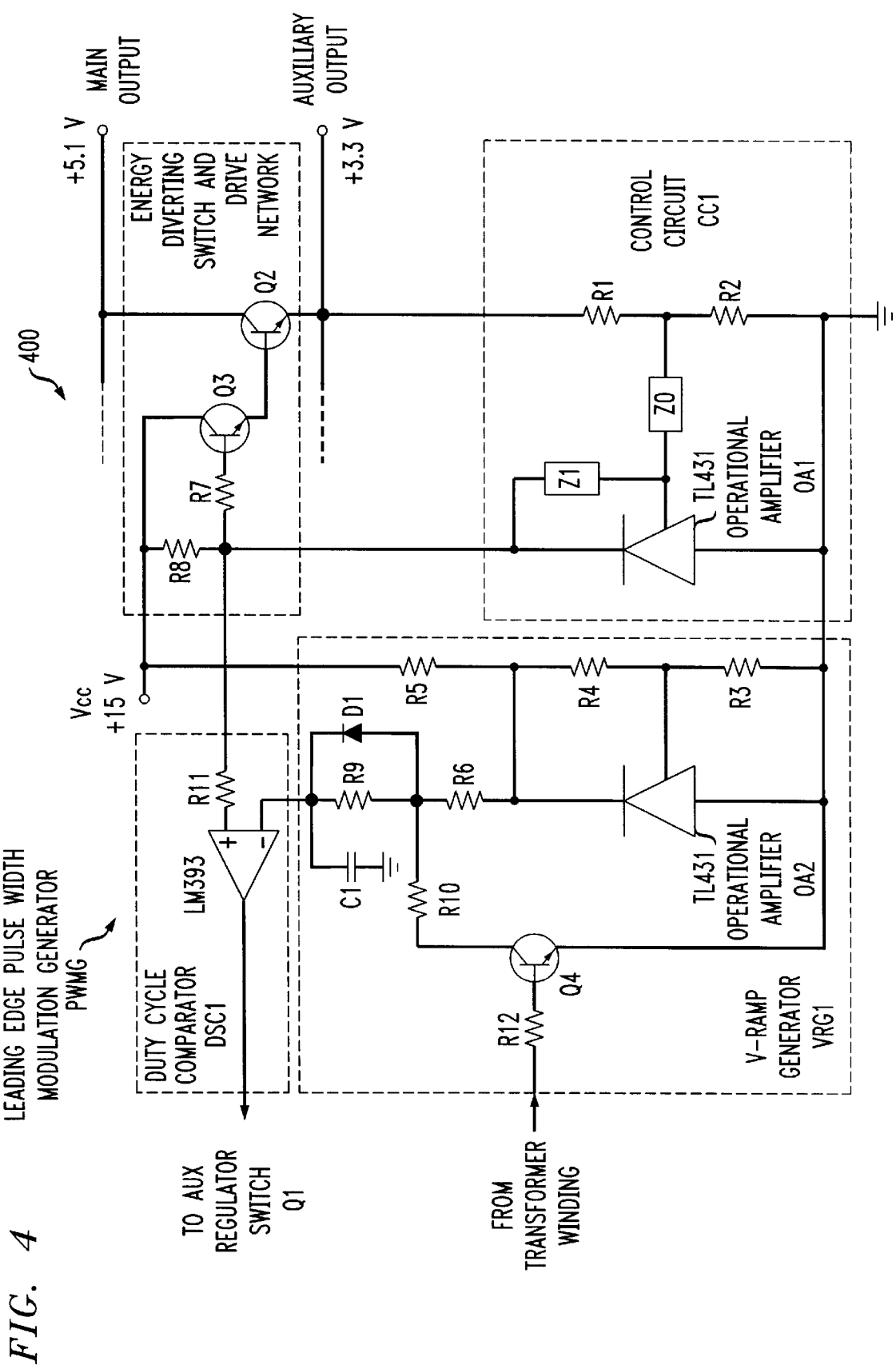
FIG. 4 illustrates a schematic diagram of another embodiment of a transient response network constructed according to the principles of the present invention.

Turning now to FIG. 4, illustrated is a schematic diagram of another embodiment of a transient response network 400 constructed according to the principles of the present invention. The transient response network 400 includes an energy diverting switch Q2 coupled to a drive network (e.g., first and second drive network resistors R7, R8 and a drive switch Q3) and a control circuit CC1. The second drive network resistor R8 provides bias to the operational amplifier OA1 and the first drive network resistor R7 limits the base current of a transistor Q3. The transistor Q3 is added to enhance the gain of the drive circuit for the energy diverting switch Q2.

The control circuit 400 includes an operational amplifier OA1 (e.g., a TL431 by Texas Instruments, Dallas, Tex.), a first resistor R1, and first and second impedance circuits Z0), Z1. The control circuit CC1 is coupled to a PWMG including a duty cycle comparator section DCS1 and a V-ramp generator section VRG1. The duty cycle comparator section DCS1 includes, in part, a comparator (e.g., an LM393 by Motorola, Phoenix, Ariz.) and the V-ramp generator section VRG1 includes, in part, an operational amplifier OA2 (e.g., a TL431).

Exemplary values for the aforementioned components are as follows.

TABLE 1

| Component | Value | Component | Value | Component | Value |
|---|---|---|---|---|---|
| R1 | 162 Ω | R2 | 2.49 kΩ | R3 | 2.49 kΩ |
| R4 | 2.49 kΩ | R5 | 2 kΩ | R6 | 1.54 kΩ |
| R7 | 3.01 kΩ | R8 | 2.49 kΩ | R9 | 8.25 kΩ |
| R10 | 100 Ω | R11 | 1 kΩ | R12 | 24.9 kΩ |
| C1 | 1000 pF | Z0 | 10 kΩ‖ 0.1 pF | Z1 | 220 pF‖ (110 kΩ + 0.1 μF) |

Overall operation of the control circuit CC1 and the leading edge PWMG are analogous to the circuit described with respect to FIG. 3. Generally, the control system operates as follows. The leading edge PWMG for the auxiliary output (shown enclosed by the dotted lines) represents a typical leading edge pulse-width modulator. The operational amplifier OA1 provides a representative voltage from the auxiliary output, which is compared to a ramp voltage from the V-ramp generator VRG1, in the duty cycle comparator DSC1. The comparison of these two signals generates the pulse width modulation needed to regulate the auxiliary output voltage via the auxiliary regulator switch Q1. During normal, steady state operation, the output voltage level of the operational amplifier OA1 is less than a conducting diode voltage drop plus the voltage level of the auxiliary output and therefore, the energy diverting switch Q2 is not conducting. In a transient condition, when the output voltage of the operational amplifier OA1 exceeds the peak value of the ramp voltage, the energy diverting switch Q2 becomes conducting which redirects energy from the main output to the auxiliary output. Therefore, even if the "effective" duty cycle of the auxiliary regulator switch Q1 vanishes to zero, the auxiliary output voltage can be maintained through the energy diverting switch Q2.

Exemplary embodiments of the present invention have been illustrated above with reference to specific electronic and magnetic components. Those skilled in the art are aware, however, that components may be substituted (not necessarily with components of the same type) to create desired conditions or accomplish desired results. For instance, multiple components may be substituted for a single component and vice-versa.

For a better understanding of power electronics control systems, see Erickson, R. W., *Fundamentals of Power Electronics*, Chapman and Hall (1997). For a better understanding of power electronics and power converter topologies, see Kassakian, et al., *Principles of Power Electronics*, Addison-Wesley Publishing Company (1991). The aforementioned references are incorporated herein by reference.

Although the present invention has been described in detail, those skilled in the art should understand that they can make various changes, substitutions and alterations herein without departing from the spirit and scope of the invention in its broadest form.

What is claimed is:

1. For use with a power converter having a main output and an auxiliary output and an auxiliary regulating switch that regulates a voltage at said auxiliary output, a transient response network, comprising:

an energy diverting switch, interposed between said main output and said auxiliary output, adapted to conduct energy from said main output to said auxiliary output; and a control circuit, coupled to said energy diverting switch, that senses a characteristic of said power converter and causes said energy diverting switch to conduct a current in response to a substantial load reduction at said main output, said transient response network thereby diverting a partial amount of said energy from said main output to said auxiliary output.

2. The network as recited in claim 1 wherein said characteristic comprises said voltage at said auxiliary output.

3. The network as recited in claim 1 further comprising a drive network coupled to said energy diverting switch.

4. The network as recited in claim 1 wherein said substantial load reduction is about a 50% reduction.

5. The network as recited in claim 1 wherein said energy diverting switch is selected from the group consisting of:

a bipolar transistor, and a field-effect transistor (FET).

6. The network as recited in claim 1 wherein said power converter further comprises a main power switch that regulates a voltage at said main output.

7. The network as recited in claim 1 wherein said power converter is selected from the group consisting of:

a buck converter, a bridge converter, a forward converter, and a flyback converter.

8. For use with a power converter having a main output and an auxiliary output and an auxiliary regulating switch that regulates a voltage at said auxiliary output, a method, comprising:

interposing an energy diverting switch between said main output and said auxiliary output, said energy diverting switch adapted to conduct energy from said main output to said auxiliary output;

sensing a characteristic of said power converter; and causing said energy diverting switch to conduct a current in response to a substantial load reduction at said main output thereby diverting a partial amount of said energy from said main output to said auxiliary output.

9. The method as recited in claim 8 wherein said characteristic comprises said voltage at said auxiliary output.

10. The method as recited in claim 8 further comprising coupling a drive network to said energy diverting switch.

11. The method as recited in claim 8 wherein said substantial load reduction is about a 50% reduction.

12. The method as recited in claim 8 wherein said energy diverting switch is selected from the group consisting of:

a bipolar transistor, and a field-effect transistor (FET).

13. The method as recited in claim 8 wherein said power converter further comprises a main power switch that regulates a voltage at said main output.

14. The method as recited in claim 8 wherein said power converter is selected from the group consisting of:

a buck converter, a bridge converter, a forward converter, and a flyback converter.

15. A power converter, comprising:

a main power switch that impresses an input voltage across a transformer;

a main output and an auxiliary output coupled across said transformer;

an auxiliary regulating switch that regulates a voltage at said auxiliary output; and a transient response network, including:

an energy diverting switch, interposed between said main output and said auxiliary output, adapted to conduct energy from said main output to said auxiliary output; and a control circuit, coupled to said energy diverting switch, that senses a characteristic of said power converter and causes said energy diverting switch to conduct a current in response to a substantial load reduction at said main output thereby diverting a partial amount of said energy from said main output to said auxiliary output.

16. The power converter as recited in claim 15 wherein said characteristic comprises said voltage at said auxiliary output.

17. The power converter as recited in claim 15 further comprising a drive network coupled to said energy diverting switch.

18. The power converter as recited in claim 15 wherein said substantial load reduction is about a 50% reduction.

19. The power converter as recited in claim 15 wherein said energy diverting switch is selected from the group consisting of:

a bipolar transistor, and a field-effect transistor (FET).

20. The power converter as recited in claim 15 further comprising a main rectifier and a main filter circuit coupled to said main output and an auxiliary rectifier and an auxiliary filter circuit coupled to said auxiliary output.

21. The power converter as recited in claim 15 wherein said power converter is selected from the group consisting of:

a buck converter, a bridge converter, a forward converter, and a flyback converter.

* * * * *